United States Patent [19]

Maxa

[11] Patent Number: 4,935,652
[45] Date of Patent: Jun. 19, 1990

[54] OPTICAL PULSE GENERATOR FOR AN ELECTRIC-MOTOR DRIVE ARRANGEMENT

[75] Inventor: Vladimir Maxa, Wuerzburg, Fed. Rep. of Germany

[73] Assignee: Siemens Aktiengesellschaft, Berlin & Munich, Fed. Rep. of Germany

[21] Appl. No.: 251,470

[22] Filed: Sep. 29, 1988

[30] Foreign Application Priority Data

Sep. 30, 1987 [DE] Fed. Rep. of Germany ....... 3733105

[51] Int. Cl.$^5$ .......................... H02K 11/00; H02K 7/10
[52] U.S. Cl. ............................... 310/68 B; 310/68 R; 310/83
[58] Field of Search ................... 310/68 R, 68 B, 83; 318/313, 640; 324/175

[56] References Cited

U.S. PATENT DOCUMENTS

| | | | |
|---|---|---|---|
| 3,570,116 | 3/1971 | Armstrong | 324/175 |
| 3,916,278 | 10/1975 | Currell | 318/313 |
| 3,995,156 | 11/1976 | Angerbach | 324/175 |
| 4,314,692 | 2/1982 | Brauer | 310/83 |

FOREIGN PATENT DOCUMENTS 066636 2/1982 European Pat. Off. .

OTHER PUBLICATIONS

IBM Technical Disclosure Bulletin, Band 22, Nr. 8A, Jan. 1980, Seiten 3091–3092, New York, U.S.; D. J. Justus: "Prevention of Contamination in an Optical Tachometer".
Patent Abstracts of Japan, Band 10, Nr. 16 (E-375) [2073] Jan. 22, 1986; & JP-A-60 176 439 (Matsushita Denki Sangyo K.K.) 10.09.1985 *Zusammenfassung*.
Patent Abstracts of Japan, Band 11, Nr. 77 (E-487) [2524] Mar. 7, 1987; & JP-A-61 231 851 (Mitsubishi Electric Corp.) 16.10.1986 *Zusammenfassung*.

Primary Examiner—Patrick R. Salce
Assistant Examiner—C. LaBalle
Attorney, Agent, or Firm—Kenyon & Kenyon

[57] ABSTRACT

An optical pulse generator for an electric-motor drive arrangement, especially for a motor vehicle window lifting drive with an electric motor and a flanged transmission is to be provided in a simple manner which improves the operating reliability of the drive arrangement while the overall size is reduced. To this end it is proposed, according to the invention, to arrange a code wheel (1) within the electric-motor drive arrangement on the rotor shift (4) of the electric motor or on a transmission output gear (5) within the flanged transmission. A protective encapsulation is achieved while the code wheel (1) is arranged on the rotor shaft (4) by a protective housing (3) supported on the code wheel (1). Alternatively, the code wheel is arranged on the transmission output gear (5), by a protective housing formed by transmission housing wall (201), the transmission output gear (5) itself. Sealing rings (8) arranged adjacent to the code wheel.

14 Claims, 1 Drawing Sheet

OPTICAL PULSE GENERATOR FOR AN ELECTRIC-MOTOR DRIVE ARRANGEMENT

BACKGROUND OF THE INVENTION a. Field of Invention

The invention relates to an optical pulse generator for a motor drive arrangement including a light transmitter, a light receiver and a code wheel enclosed in a protective housing.

b. Description of the Prior Art

An optical pulse generator is known from European Patent No. EP-A1-0 066 636. In this patent, an optical pulse generator is fastened to the electric motor on the outside after the latter is completely assembled. For this purpose the protective housing is firmly connected to the stator housing at the end face and the code wheel is placed on an end of the rotor shaft protruding from the motor. In each half of the protective housing, axial openings are provided for the light transmitter and the light receiver, respectively.

OBJECTIVES AND SUMMARY OF THE INVENTION

It is an objectives of the present invention to provide an optical pulse generator in a production-wise simple manner which improves the operating reliability of the drive arrangement while the overall size is reduced at the same time.

By the arrangement of the optical pulse generator within the stator housing of the electric motor or the transmission housing, a particularly compact electric-motor drive arrangement can be provided in a production-wise and installation-wise simple manner. The support of the protective housing at the code wheel remains unchanged. The arrangement of the code wheel and the transmitting and receiving device which is advantageous for a reliable speed determination, is assured under all operating conditions, especially in the case of position changes of the code wheel due to undesirable axial and/or centrifugal motions. At the same time, great freedom in the arrangement of the optical pulse generator is obtained since the installation of the code wheel can be made at a larger distance from the shaft bearings.

A light transmitter is arranged in the one half of the protective housing and a light receiver in the other half of the protective housing. For the complete encapsulation of the code wheel. The aperture raster of the code wheel is advantageously formed by successive windows or by successive line markings.

The support of the protective housing and the protection of the code wheel against dirt can further be improved by the provision that the code wheel is fastened on the rotor shaft via an axially formed-on projecting hub and the protective housing is supported at the hub.

In the arrangement of the code wheel provided according to the invention on or at the end face of the transmission output gear, the protective housing is formed by the transmission housing wall, the transmission output gear and the sealing rings arranged therebetween. Therefore, separate parts for forming an encapsulated protective housing can largely be dispensed with.

BRIEF DESCRIPTION OF THE FIGURES

The invention as well as further advantageous embodiments of the invention will be explained in the following in greater detail, in conjunction with the figures, wherein.

DETAILED DESCRIPTION OF THE INVENTION

Figures 1, 2, 3:
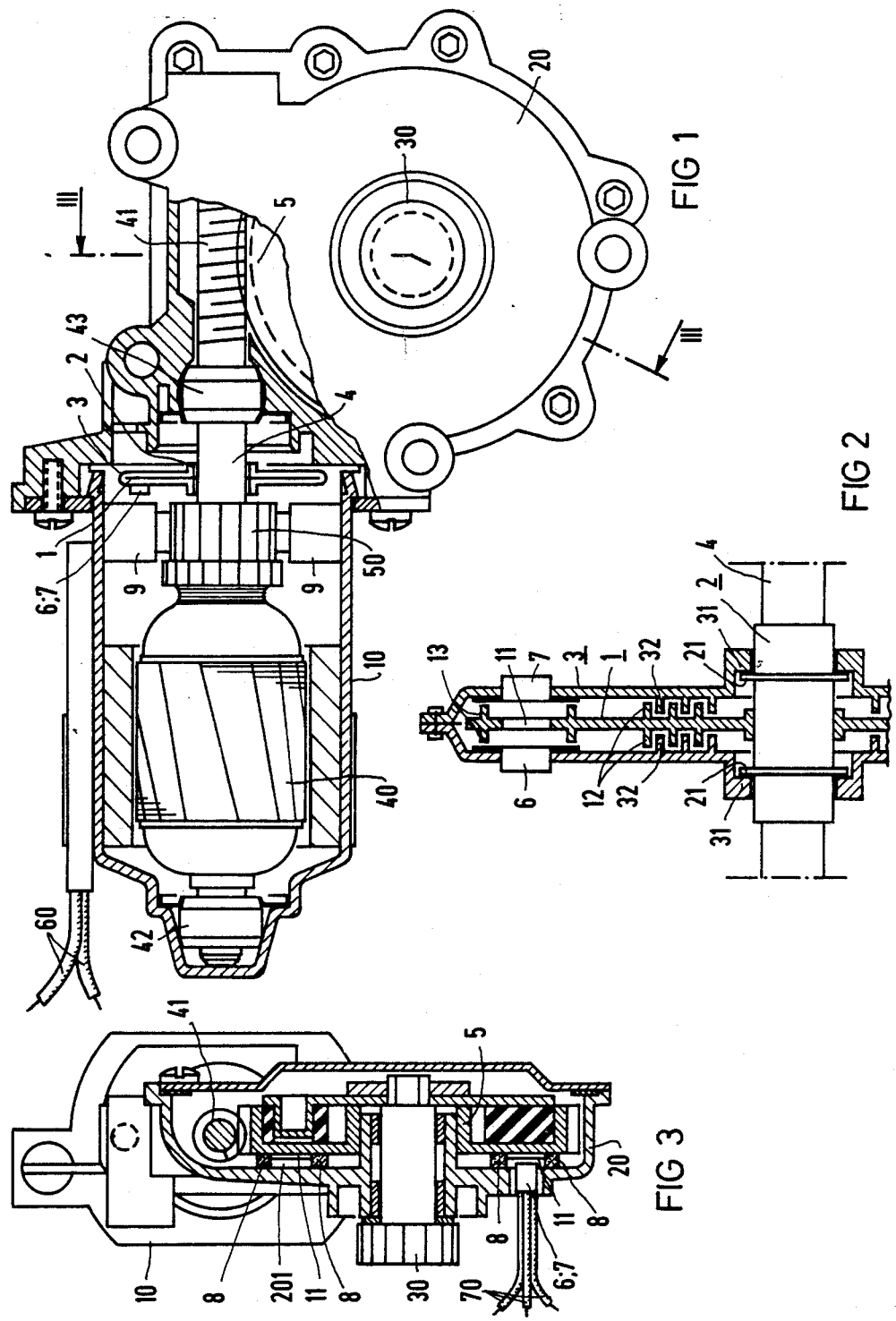
FIG. 1 shows in an axial longitudinal partial section, a motor vehicle window lifting drive with a code wheel arranged within a stator housing of an electric motor.
FIG. 2 shows in more detail, an axial longitudinal section through the optical pulse generator.
FIG. 3, shows a section through the transmission housing of the motor vehicle window lifting drive shown in FIG. 1 taken along the line III—III through the transmission output gear.

FIG. 1 shows in an axial longitudinal partial section, a motor vehicle window lifting drive which consists essentially of a half-shell-shaped transmission housing 20 and a stator housing 10, having on its left side a permanent-magnet-excited commutator motor. The rotor shaft 4 is supported between two spherical bearings 42, 43 and supports in turn a rotor lamination stack 40 with a rotor winding and a commutator 50. A brush system 9 slides on the commutator. The rotor shaft 4 is extended beyond the right spherical bearing 43 to form a worm drive shaft 41 and drives a transmission output gear 5 which is rotatably supported on a drive shaft 30.

A pulse generator is arranged between the commutator 50 and the right spherical bearing 43, and it includes a code wheel 1 fastened on the rotor shaft 4 via an axially projecting protruding hub 2. A protective housing 3 is supported on the hub 2 as shown. A light source 6 and the light receiver 7 are arranged on the housing according to one embodiment of the invention, in the same half of the protective housing 3 whereby the light transmitter generates light which is selectively reflected by the code wheel back to the light transmitter. Connecting leads, not shown here, are disposed in the interior of the stator housing, for the light transmitter 6 and the light receiver 7, and according to one embodiment of the invention, comprise a flat cable. The connecting leads are brought out of the stator housing 10 together with the connecting leads of the brush system 9 and combine to form the common cable 60 shown in FIG. 4. Advantageously, no additional holes are required in the stator housing 10.

The design of the connecting leads of the light transmitter 6 and the light receiver 7 as flat cables has the advantage that the optical pulse generator is kept, on the one hand, flexible in the axial and radial direction, so that the axial play and the shaft offsets can be taken up by the optical pulse generator and on the other hand, undesirable rotation of the protective housing 3 during the rotary motion of the motor shaft 4 can additionally be prevented by the relatively stiff flat cable.

Alternatively, the optical pulse generator can also be slipped onto the other rotor shaft end, especially in the case of other electric-motor drive arrangements.

FIG. 2 shows a more detailed magnification of FIG. 1 in an axial longitudinal section through the optical pulse generator, in which contrary to the pulse generator shown in FIG. 1, a light transmitter 6 is arranged in the one half of the protective housing 3 and a light receiver 7 is arranged in the other half of the housing 3 whereby light from transmitter 6 passes selectively through a raster on the code wheel and is detected by the receiver 7.

According to one embodiment of the invention, the code wheel 1 is fastened on the rotor shaft 4 via an axially formed projecting hub 2 and the protective housing 3 is supported at the hub 2. The mounting of the hub 2 is improved by the external guiding rings 21 extending in the radial direction, which are disposed adjacent to corresponding circular guiding shoulders 31 of the protective housing 3. As an alternative, not shown here, it is also possible to provide the protective housing 3 with external guiding rings extending in the circumferential direction which are disposed adjacent corresponding circular guiding shoulders of the hub 2. Together with the spacer rings 13 which are provided on the two end faces of the code wheel 1 which are projecting axially and are directed against the inside of the protective housing 3. A constant axial distance of the light transmitter 6 and the light receiver 7 from the aperture raster 11 is obtained in the event of axial movements of the rotor shaft 4, so that a reliable speed determination is assured.

The protection of the aperture raster 11, the light transmitter 6 and the light receiver 7 against dirt is advantageously improved by the provision that both end faces of the code wheel 1 and the protective housing 3 are equipped with alternatively axially axial rings 12, 32 which extend the paths for possibly penetrating dirt particles to form a labyrinth seal.

In order to reduce the friction between the rotating code wheel 1 and the protective housing 3 which is supported at the code wheel 1, the code wheel 1 and/or the protective housing 3 consist of a flexible material with a small coefficient of friction, such as a plastic for material.

FIG. 3 shows a section through the transmission housing 20 of the motor vehicle window lifting drive shown in FIG. 1, according to the line III—III. Within the transmission housing 20, the transmission output gear 5 is supported rotatably on an output shaft 30. As an alternative to the arrangement shown in FIGS. 1, 2, the code wheel 1 is arranged on the end face 51 of the transmission output gear 5.

The light transmitter 6 and the light receiver 7 are fastened tightly in the transmission housing wall 201 and their connecting leads 70 are brought out as flat cable is directly from the outside wall of the transmission housing 20. The vicinity of the transmission output gear 5, to which the aperture raster 11 is applied, is protected against dirt by sealing rings 8. The sealing rings 8 can be fastened in this embodiment either with their one end facing the transmission housing wall 201 or the transmission output gear 5. In the first constance, the sealing rings 8 are stationary. In the second constance the sealing rings 8 rotate with respect to the transmission output gear 5. The frictional losses generated by the sealing rings 8 within the electric-motor drive arrangement are reduced by a reduction terminal by the worm drive shaft 41 of 1:50 to 1:70 in accordance with the transmission ratio.

It would seem to be obvious that by the arrangement of the optical pulse generator within the electric motor drive arrangement according to the invention, the operating liability of the drive arrangement is improved in a production-wise and installation-wise simple and thereby inexpensive manner while the overall size is reduced at the same time.

What is claimed is:

1. An optical pulse generator for an electric motor drive arrangement of a motor vehicle, said electric motor drive arrangement having a stator housing and a rotor shaft, comprising:
   a code wheel disposed on said rotor shaft within said stator housing, said code wheel having a pair of end faces;
   a light transmitter and a light receiver arranged within said stator housing to produce pulses indicative of a movement of said code wheel; and
   a protective housing supported on said rotor shaft adjacent each end face of said code wheel and surrounding said code wheel.

2. The optical pulse generator according to claim 1, wherein said light transmitter is arranged in one half of the protective housing and said light receiver is arranged in another half of the protective housing, and said code wheel includes an aperture raster formed by successive windows.

3. The optical pulse generator according to claim 1 wherein said code wheel is fastened on the rotor shaft through an axially formed hub and said protective housing is supported on the hub.

4. The optical pulse generator according to claim 3 wherein said hub is provided with outside guiding rings which extend in a radial direction and are disposed adjacent to circular guiding shoulders of the protective housing.

5. The optical pulse generator according to claim 3, wherein said protective housing is provided with external guiding rings which extend in the radial direction and are disposed adjacent to corresponding circular guiding shoulders of the hub.

6. The optical pulse generator according to claim 1 wherein both end faces of the code wheel inside of the protective housing are provided with rings which alternatingly extend axially.

7. The optical pulse generator according to claim 1 wherein both end faces of the code wheel are provided with axially protruding spacer rings which are directed toward the inside of the protective housing.

8. The optical pulse generator according to claim 1 wherein said light transmitter and said light receiver are arranged in one half of the protective housing or in the transmission housing wall and the aperture raster of the coded wheel is formed as successive line markings.

9. The optical pulse generator according to claim 1 wherein said code wheel consists of a flexible material with a small coefficient of friction.

10. The optical pulse generator according to claim 1 further comprising connecting leads from said light transmitter and said light receiver designed as flat cables.

11. In an electric motor drive arrangement, particularly a gear reduction motor of motor vehicle lifting drive, including a transmission housing wall and a transmission output gear with an end face extending at a preselected distance from said transmission housing wall, an optical pulse generator comprising:
   a code wheel disposed at said end face, and having an aperture raster;
   a light transmitter and a light receiver cooperating with said code wheel to produce pulses indicative of the rotation of said motor drive;
   a two-part protective housing enclosing said code wheel, said light transmitter and said light receiver; and
   sealing rings arranged outside said aperture raster between said transmission housing wall and said code wheel.

12. The optical pulse generator according to claim 11, wherein said output gear is designed as said code wheel.

13. The optical pulse generator according to claim 11 wherein said sealing rings are fastened to the transmission housing wall at end face and slide with another end face on the code wheel.

14. The optical pulse generator according to claim 11 wherein said sealing rings are fastened with one end face on the output gear and slide with another end face on the transmission housing wall.

* * * * *